(12) United States Patent
Carr

(10) Patent No.: US 8,387,456 B2
(45) Date of Patent: Mar. 5, 2013

(54) GRAVITY GRADIENT SENSOR

(75) Inventor: Dustin Wade Carr, Albuquerque, NM (US)

(73) Assignee: Symphony Acoustics, Inc., Rio Rancho, NM (US)

( * ) Notice: Subject to any disclaimer, the term of this patent is extended or adjusted under 35 U.S.C. 154(b) by 1023 days.

(21) Appl. No.: 12/405,431

(22) Filed: Mar. 17, 2009

(65) Prior Publication Data

US 2009/0235740 A1 Sep. 24, 2009

Related U.S. Application Data

(60) Provisional application No. 61/037,661, filed on Mar. 18, 2008.

(51) Int. Cl.
*G01V 7/00* (2006.01)
(52) U.S. Cl. .............. 73/382 G; 356/450; 73/382 R
(58) Field of Classification Search .............. 73/382 R, 73/382 G; 356/450
See application file for complete search history.

(56) References Cited

U.S. PATENT DOCUMENTS

| | | | | | |
|---|---|---|---|---|---|
| 3,727,462 A | * | 4/1973 | Stone et al. | .................. | 73/382 R |
| 3,744,909 A | * | 7/1973 | Bruce | ........................... | 356/450 |
| 4,383,762 A | * | 5/1983 | Burkert | ......................... | 356/455 |
| 5,892,151 A | * | 4/1999 | Niebauer et al. | ............ | 73/382 R |
| 6,671,057 B2 | * | 12/2003 | Orban | ........................... | 356/496 |
| 7,222,534 B2 | * | 5/2007 | Maas et al. | .................. | 73/514.26 |
| 7,349,591 B2 | * | 3/2008 | Maas | ............................... | 385/13 |
| 7,469,585 B2 | | 12/2008 | Meyer | | |
| 7,707,883 B2 | * | 5/2010 | DiFoggio | .................... | 73/382 R |
| 7,954,375 B2 | * | 6/2011 | Zaugg | .......................... | 73/382 G |
| 8,286,485 B2 | * | 10/2012 | Benischek et al. | ......... | 73/382 R |
| 2003/0081218 A1 | * | 5/2003 | Orban | ........................... | 356/450 |
| 2006/0219009 A1 | * | 10/2006 | Maas et al. | .................. | 73/514.26 |
| 2007/0189658 A1 | * | 8/2007 | Maas | ............................. | 385/12 |
| 2009/0219546 A1 | * | 9/2009 | Benischek | .................... | 356/482 |

FOREIGN PATENT DOCUMENTS

| JP | 2009115525 A | * | 5/2009 |
|---|---|---|---|
| SU | 953609 B | * | 8/1982 |

\* cited by examiner

*Primary Examiner* — Peter Macchiarolo
*Assistant Examiner* — Samir M Shah
(74) *Attorney, Agent, or Firm* — Kaplan Breyer Schwars & Ottesen, LLP

(57) ABSTRACT

A gravimeter for detecting a gravity difference between two points is disclosed. The gravimeter comprises an interferometric arrangement wherein the length of a reference arm is dependent upon the gravity local to a first accelerometer and the length of a sample arm is dependent upon the gravity local to a second accelerometer. A pair of photodetectors that operate in complimentary fashion provide electrical signals based on a first signal conveyed by the reference arm and a second signal conveyed by the sample arm. A change in the differential gravity between the two points induces equal and opposite changes to the magnitudes of the two electrical signals.

18 Claims, 7 Drawing Sheets

GRAVITY GRADIENT SENSOR

CROSS REFERENCE TO RELATED APPLICATIONS

This case claims priority to: U.S. Provisional Patent Application Ser. No. 61/037,661, filed Mar. 18, 2008, which is incorporated by reference.

If there are any contradictions or inconsistencies in language between this application and one or more of the cases that have been incorporated by reference that might affect the interpretation of the claims in this case, the claims in this case should be interpreted to be consistent with the language in this case.

FIELD OF THE INVENTION

The present invention relates to gravimeters in general, and, more particularly, to gradient gravimeters.

BACKGROUND OF THE INVENTION

Gravimetric sensing is a powerful tool for used in such applications as geological surveying, oil field exploration, earthquake detection, homeland defense, and shipping container shock detection. A gravimeter is an instrument used measuring a local gravitational field. A gravimeter is a highly sensitive type of accelerometer, specialized for measuring the constant downward acceleration of gravity. Gravimeters have better sensitivity than a conventional accelerometer, however, which enables them to measure very tiny fractional changes within the Earth's gravity. Such small changes in local gravity can be caused by, among other things, a geologic structure, a mass of highly dense material (e.g., nuclear material and its storage container), or the shape of the Earth.

An absolute gravimeter provides an absolute value for gravity local to a position. A typical absolute gravimeter comprises a mass that is propelled upward to an apex, from which it subsequently free-falls. This is normally performed in a vacuum to mitigate the effects of air friction. Acceleration is determined based on the characteristics of the free-fall of the mass. In some prior-art gravimeters, the mass includes a retroreflector that terminates one arm of a Michelson interferometer. By counting and timing the interference fringes, the velocity and acceleration of the mass during free-fall can be determined. In some cases, the system measures both upward and downward motion of the mass, thereby enabling the cancellation of some systematic measurement errors.

Two or more gravimeters can be used in unison to provide a relative measure of gravity over a region. Two- or three-dimensional mapping of a gravitational field can provide a great deal of information about sub-surface structure and materials. A sensor that is capable of precisely mapping the gradients in the gravitational field can offer a high degree of precision about the density profiles of nearby geological formations, such as mineral deposits or subterranean oil fields.

The most common type of relative gravimeter is spring based. A spring-based relative gravimeter is basically a weight on a spring, and by measuring the amount by which the weight stretches the spring, local gravity can be determined. The spring must be carefully calibrated, however. This is typically done by placing the instrument in a location with a known gravitational acceleration.

The high-sensitivity of a gravimeter makes it susceptible to extraneous vibrations. Numerous approaches have been used to attempt to mitigate the deleterious effects of such vibrations. For example, many gravimeters include integrated vibration isolation. Unfortunately, such isolation requires complex and expensive infrastructure and affords only partial isolation. Sophisticated post-measurement signal processing has also been applied to reduce the noise due to vibrations and improve signal-to-noise ratio (SNR). This requires, however, a highly developed model of the noise sources and also adds to the cost and complexity of the gravimeter system. Alternatively, since some applications do not require gravity measurements at high speed, attempts to improve SNR have included time-averaging the output of the device. Although time averaging offers improvement in gravimeter sensitivity, it precludes the use of such systems in many applications.

SUMMARY OF THE INVENTION

The present invention provides a means for detecting a gravity gradient between two locations without some of the costs and disadvantages of the prior art. Some embodiments of the present invention are particularly well-suited for use in applications such as oil field exploration, mineral prospecting, and geological surveying.

Some embodiments of the present invention comprise an interferometer arrangement that has a reference arm and a sample arm. The length of the reference arm is dependent upon the position of a first mirror that is physically coupled to a mass of a first accelerometer located at a first location. The length of the sample arm is dependent upon the position of a second mirror that is physically coupled to a mass of a second accelerometer located at a second location. The position of each mass and, therefore, the length of each of the reference and sample arms, is affected by the gravitational field local to its respective accelerometer.

An input signal is split into a reference signal and a sample signal. The reference signal is conveyed through the reference arm to a first mirror at a first location. The sample optical signal is conveyed through the sample arm to a second mirror at a second location. The reference and sample signals are reflected from their respective mirrors to a beam splitter. The beam splitter distributes the reference signal into a first reference component on a first signal and a second reference component on a second signal. The beam splitter also distributes the sample signal into a first sample component on the first signal and a second sample component on the second signal. A phase shift of P radians is induced on the second sample component with respect to the first sample component. As a result, a change in the gravity difference between the first location and the second location induces changes to the intensity of the first signal that is equal and opposite to a change in the intensity of the second signal.

In some embodiments, two-dimensional sensor modules are located at each of the first location and second location. As a result, such embodiments enable a measure of differential gravity in two dimensions between the two locations.

In some embodiments, three-dimensional sensor modules are located at each of the first location and second location. As a result, such embodiments enable a measure of differential gravity in three dimensions between the two locations.

In some embodiments, mechanical energy is conveyed between the sensors at the first location and the second location. As a result, such embodiments are less susceptible to noise due to shock, vibration, and external acceleration.

In some embodiments, thermal energy is conveyed between the sensors at the first location and the second location. As a result, such embodiments are less sensitive to noise due to thermal gradients between the two locations.

An embodiment of the present invention comprises a first interferometer, wherein the first interferometer comprises: a first reference arm having a first reference path length that is based on a first gravitational field, wherein the first reference arm conveys a first reference signal; a first sample arm having a first sample path length that is based on a second gravitational field, wherein the first sample arm conveys a first sample signal; a first beam splitter, wherein the first beam splitter distributes the first reference signal into a first signal and a second signal, and wherein the first beam splitter distributes the first sample signal into the first signal and the second signal; a first photodetector, wherein the first photodetector receives the first signal; and a second photodetector, wherein the second photodetector receives the second signal; wherein a change in the difference between the first reference path length and the first sample path length induces a first intensity change in the first signal and a second intensity change in the second signal, and wherein the first intensity change and the second intensity change are equal and opposite.

DETAILED DESCRIPTION

Figure 1:
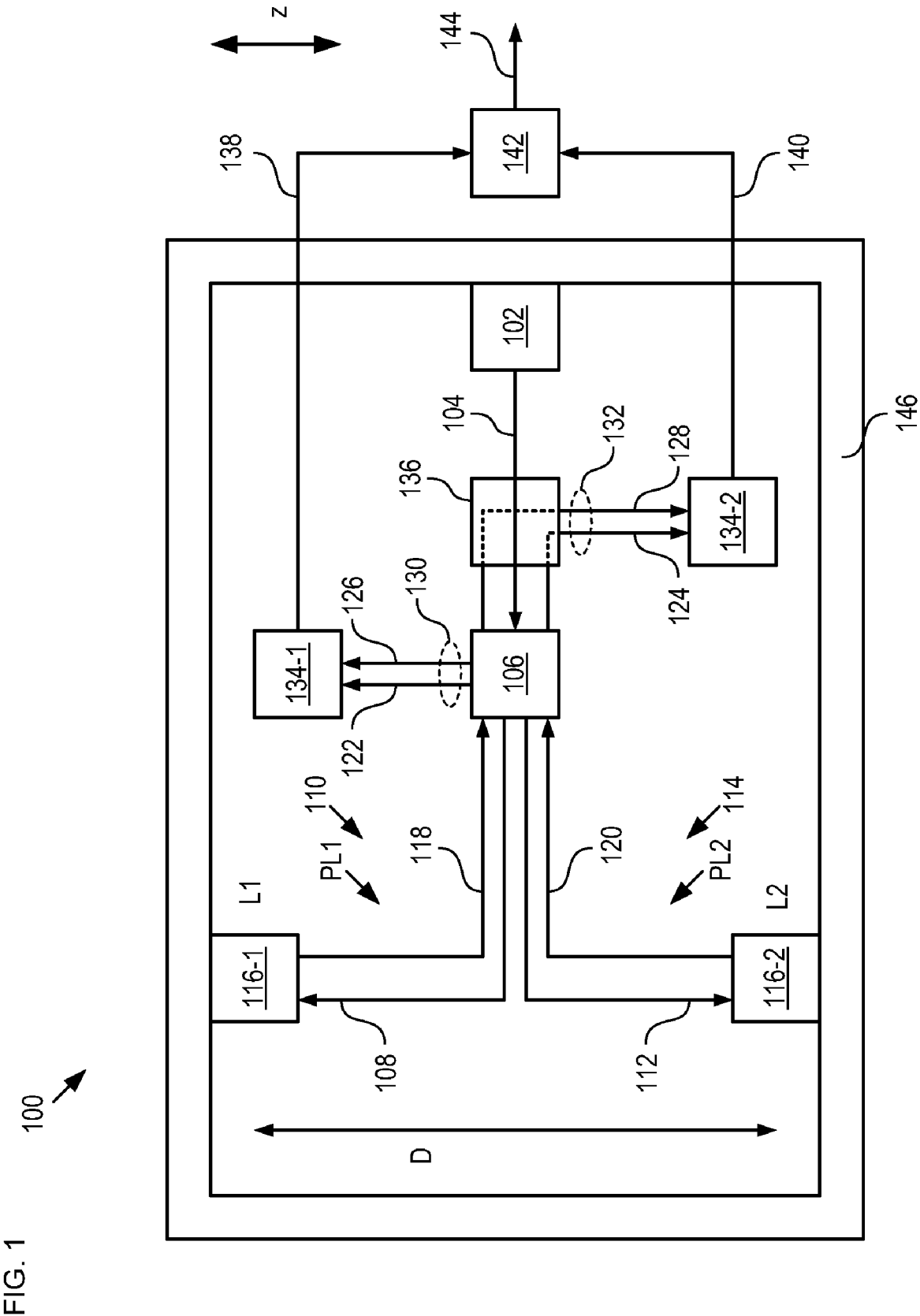
FIG. 1 depicts a schematic diagram of details of a differential gravimeter in accordance with an illustrative embodiment of the present invention.

FIG. 1 depicts a schematic diagram of details of a differential gravimeter in accordance with an illustrative embodiment of the present invention. Gravimeter 100 comprises source 102, beam splitter 106, sensors 116-1 and 116-2, photodetectors 134 and 138, processor 142, and frame 146.

Gravimeter 100 provides an output signal based on a difference in a first gravitational field at location L1 that is aligned with the z-direction and a second gravitational field at location L2 that is aligned with the z-direction. For the purposes of this specification, including the appended claims, the axes and/or directions are "aligned" if they are collinear, or if they are non-collinear but are substantially parallel.

Figure 2:
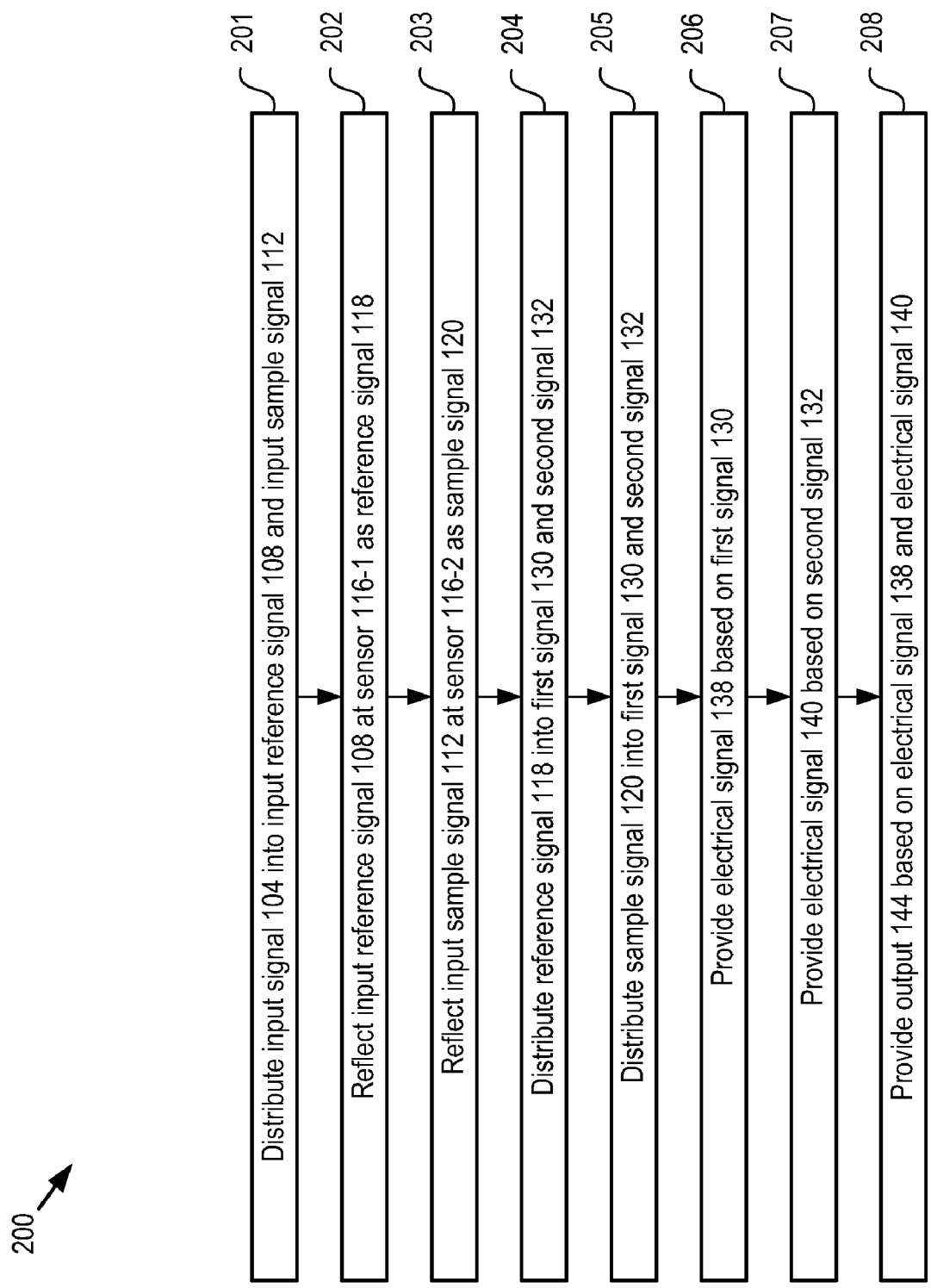
FIG. 2 depicts a method for sensing a gravity gradient between two locations in accordance with the illustrative embodiment of the present invention.

FIG. 2 depicts a method for sensing a gravity gradient between two locations in accordance with the illustrative embodiment of the present invention. Method 200 is described with continuing reference to FIG. 1.

Figure 3:
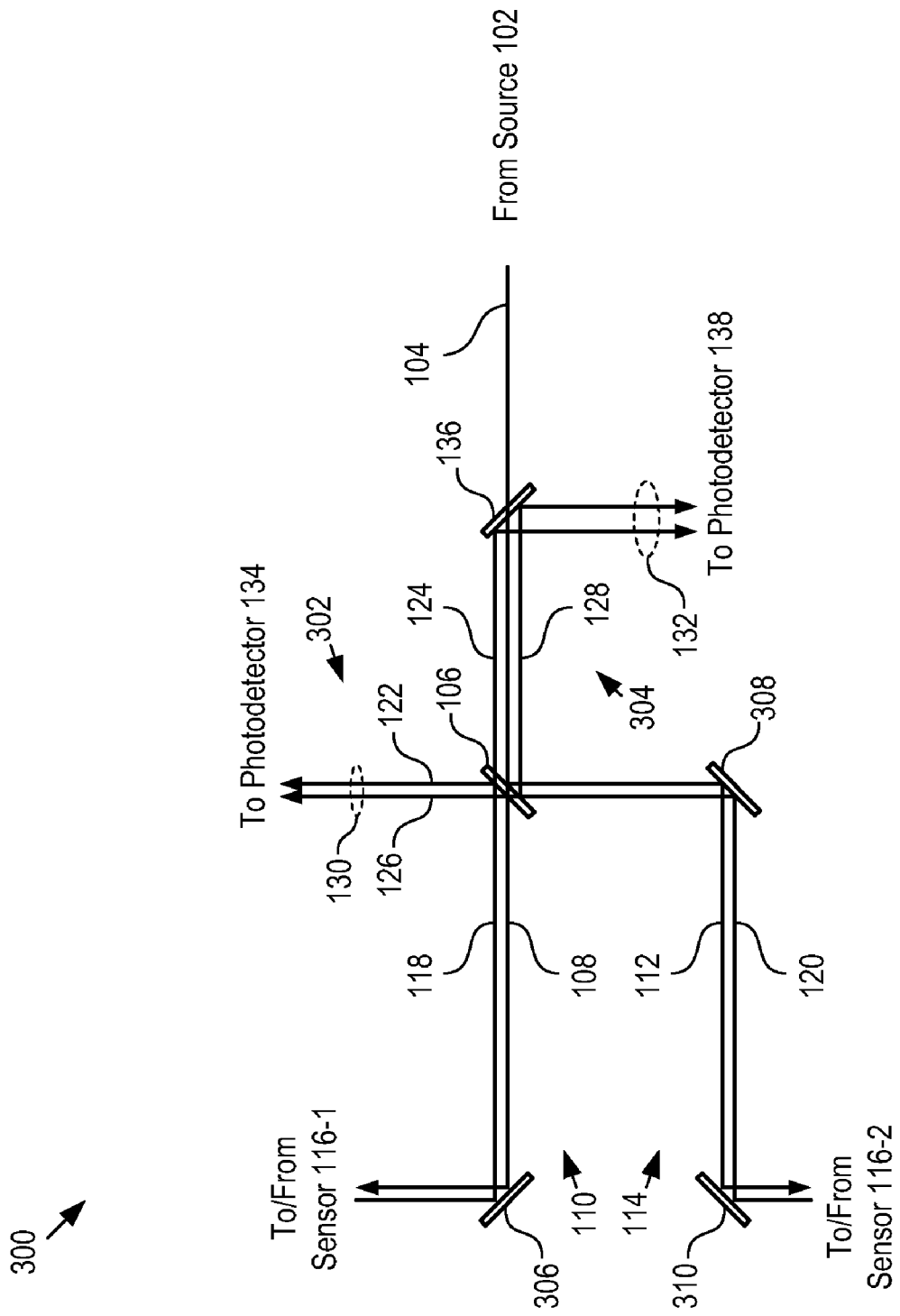
FIG. 3 depicts a schematic drawing depicting details of an optical system in accordance with the illustrative embodiment of the present invention.

FIG. 3 depicts a schematic drawing depicting details of an optical system in accordance with the illustrative embodiment of the present invention. Optical system 300 depicts the optical system of gravimeter 100. FIG. 3 is described with continuing reference to FIGS. 1 and 2. Optical system 300 comprises reference arm 110, sample arm 114, detector arm 302, and detector arm 304.

Source 102 provides input signal 104, which is substantially monochromatic light. Input signal 104 passes through circulator 136 and is received by beam splitter 106. It will be clear to one skilled in the art how to make, use, and specify source 102, beam splitter 106, and circulator 136.

Method 200 begins with operation 201, wherein beam splitter 106 distributes the optical energy of input signal 104 and equally into input reference signal 108 on reference arm 110 and input sample signal 112 on sample arm 114.

Reference signal 108 is described as electric field:

$$E_R(x, t) = \frac{E_0}{2} e^{(i\omega t + 2\pi x/\lambda)}, \quad (1)$$

where $E_0$, $\omega$, and $\lambda$ are the maximum intensity, frequency, and wavelength, respectively, of input signal 104, and x is the propagation distance from beam splitter 106.

In similar fashion, sample signal 112 is described as electric field:

$$E_S(x, t) = \frac{E_0}{2} e^{(i\omega t + 2\pi x/\lambda)}. \quad (2)$$

Input reference signal 108 and input sample signal 112 are coherent signals as they leave beam splitter 106. In some embodiments, input signal 104 is distributed unequally into input reference signal 108 and input sample signal 112.

Reference arm 110 conveys input reference signal 108 to sensor 116-1. Reference arm 110 comprises turning mirror 306, which aligns input reference signal 108 with the z-direction.

Sample arm 114 conveys input sample signal 112 to sensor 116-2. Sample arm 114 comprises turning mirrors 308 and 310, which align input sample signal 112 with the z-direction.

It should be noted that the use of the terms "reference" and "sample," as used herein, are assigned arbitrarily and serve only to conveniently distinguish one path and set of signals from the other. One skilled in the art will recognize that, for example, arm 110 could have been designated as the sample and arm 114 could have been designated as the reference arm.

At operation 202, sensor 116-1 receives input reference signal 108 and reflects it back through reference arm 110 as reference signal 118.

The path length PL1 of reference arm 110 is the combined distance traveled by input reference signal 108 and reference signal 118. In other words, path length PL1 is equal to twice the distance between beam splitter 106 and sensor 116-1.

At operation 203, sensor 116-2 receives input sample signal 112 and reflects it back through sample arm 114 as sample signal 120.

The path length PL2 of sample arm 114 is the combined distance traveled by input sample signal 112 and sample signal 120. In other words, path length PL2 is equal to twice the distance between beam splitter 106 and sensor 116-2.

Sensors 116-1 and 116-2 are attached to frame 146 at locations L1 and L2, respectively. Locations L1 and L2 are separated by distance D. Typically distance D is within the range of approximately 0.5 meters (m) to approximately 3 m.

Frame 146 is a mechanically rigid frame suitable for conveying mechanical energy between sensors 116-1 and 116-2. In some embodiments, frame 146 conveys thermal energy between sensors 116-1 and 116-2. In some embodiments, frame 146 conveys both mechanical energy and thermal energy between sensors 116-1 and 116-2. By virtue of the fact that frame 146 conveys energy between sensors 116-1 and 116-2, external vibrations, accelerations, shocks, temperature changes, etc., are common to both sensors. As a result, gravimeter 100 can have an improved SNR. In some embodiments, frame 146 is not included.

Figure 4:
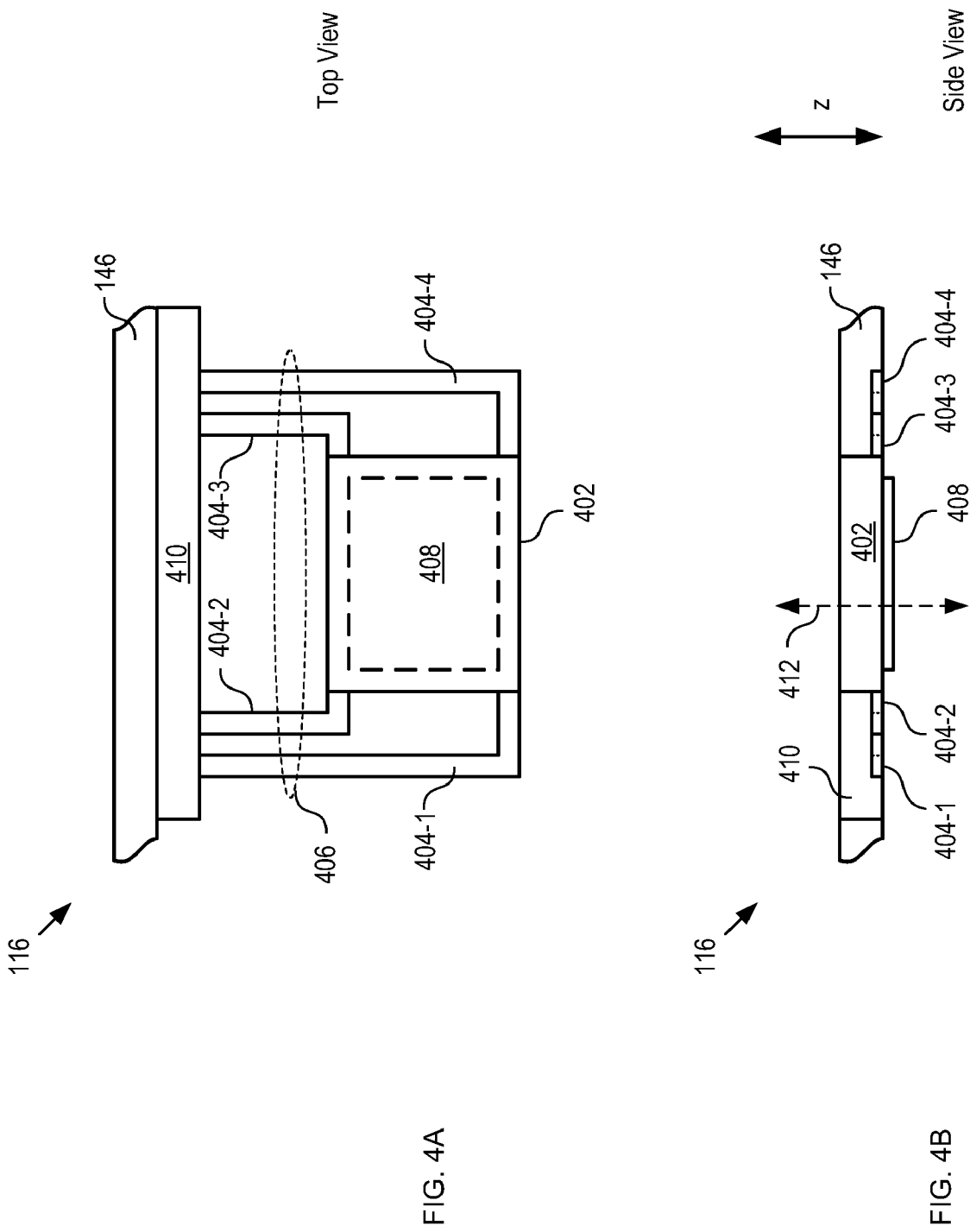
FIG. 4A depicts a top view of a sensor in accordance with the illustrative embodiment of the present invention.
FIG. 4B depicts a side view of a sensor in accordance with the illustrative embodiment of the present invention.

FIGS. 4A and 4B depict a top view and side view of a sensor in accordance with the illustrative embodiment of the present invention. Sensor 116 is representative of each of sensors 116-1 and 116-2. FIG. 4 is described with continuing reference to FIGS. 1, 2, and 3.

It should be noted that sensor 116 is merely one example of a sensor suitable for use in gravimeter 100. One skilled in the art will recognize that the present invention merely requires a sensor that comprises a mirror whose position is based on the gravitational field local to the sensor's location.

Sensor 116 comprises mass 402, tethers 404-1 through 404-4, mirror 408, and bulkhead 410.

Mass 402 is a rigid block of material having a known mass. Mass 402 is attached to bulkhead 410 by tether system 406. Mass 402 comprises mirror 408, which is disposed on the bottom surface of mass 402. The position of mirror 408, with respect to mass 402, depends upon the optical system used to interrogate it. In some embodiments, mirror 408 is disposed on the top surface of mass 402. In some embodiments a mirror 408 is disposed on both the top and bottom surfaces of mass 402.

Tether system 406 comprises tethers 404-1 through 404-2 (collectively referred to as tethers 404). Each of tethers 404 is a resilient element that enables motion of mass 402 along axis 412, which is aligned with the z-direction, as shown.

The specific shapes and sizes of mass 402, mirror 408, and tether system 406 are design considerations that are application dependent. For most applications, mass 402 has a circular or square shape having a diameter or width within the range of approximately 0.5 millimeters (mm) to approximately 20 mm. The illustrative embodiment depicts an exemplary design comprising: a mass and a tether system comprising four tethers; The mass having a square shape of approximately 15 mm on a side and a thickness of approximately 1 mm; each tether having a length of approximately 10 mm and a thickness of 0.1 mm and a width of 0.1 mm. Further, although the illustrative embodiment comprises four tethers 404, it will be clear to one skilled in the art, after reading this specification, how to specify, make, and use embodiments of the present invention wherein sensor 116 comprises any number of tethers 404.

Suitable materials for mass 402, frame 146, and tether 406 include, without limitation, semiconductors, semiconductor compounds, dielectrics, glasses, polymers, ceramics, metals, and composite materials. In some embodiments, mass 402, frame 146, and tether 406 are formed from a continuous layer of material.

In the illustrative embodiment, mirrors 408-1 and 408-2 are separated from beam splitter 106 by the same distance. When the gravitational field at location L1 is equal to the gravitational field at location L2, the position of mass 116-1 along axis 412-1 is equal to the position of mass 116-2 along axis 412-2. PL1 and PL2, therefore, are equal.

In some embodiments, sensors 116-1 and 116-2 are separated from beam splitter 106 by different distances and PL1 and PL2 have different path lengths when the gravitational fields at locations L1 and L2 are the same. In such embodiments, therefore, the phases of reference sample 118 and sample signal 120, as received by beam splitter 106, are out of phase by an amount based on the difference in their path lengths. Such embodiments can have greater sensitivity to wavelength noise than the illustrative embodiment, however.

In some embodiments sensors 116-1 and 116-2 are in opposing orientation along the z-direction. In some embodiments, sensors 116-1 and 116-2 are in the same orientation along the z-direction. In some embodiments, a gravitational field that is relatively greater at location L2 results in an increase in path length PL2 relative to path length PL1. In some embodiments, a gravitational field that is relatively greater at location L2 results in a decrease in path length PL2 relative to path length PL1.

At operation 204, beam splitter 106 receives reference signal 118 and distributes it equally into first signal 130 on detector arm 302 and second signal 132 on detector arm 304. In operation 204, beam splitter 106 reflects reference component 122 to photodetector 134 and passes reference component 124 to photodetector 134-2.

At operation 205, beam splitter 106 receives sample signal 120 and distributes it equally into first signal 130 on detector arm 302 and second signal 132 on detector arm 304. In operation 205, beam splitter 106 reflects sample component 128 to photodetector 134-2 and passes sample component 126 to photodetector 134.

Reference component 124 and sample component 128 (i.e., second signal 132) are directed toward photodetector 134-2 by turning mirror 136.

Reference component 122 and sample component 126 combine as first signal 130, which has an electric field described as:

$$\left\langle \left| \frac{E_R(PL1,t)}{2} + \frac{E_S(PL2,t)}{2} \right|^2 \right\rangle = \tag{3}$$

$$\left\langle \left| \frac{E_R}{4}\exp(i\omega t + \varphi_1 - \frac{\pi}{2}) + \frac{E_S}{4}\exp(i\omega t + \varphi_2) \right|^2 \right\rangle,$$

where $\phi_1 = 2\Pi PL1/\lambda$, and $\phi_2 = 2\Pi PL2/\lambda$. Equation (3) can be further expanded to:

$$\frac{E_R^2}{16} + \frac{E_S^2}{16} + \frac{E_R E_S}{4}\cos(\varphi_1 - \varphi_2 - \frac{\pi}{2}). \tag{4}$$

In similar fashion, reference component 124 and sample component 128 combine as second signal 132, which has an electric field described (in expanded form) as:

$$\frac{E_R^2}{16} + \frac{E_S^2}{16} + \frac{E_R E_S}{4}\cos(\varphi_1 - \varphi_2 + \frac{\pi}{2}). \tag{5}$$

It is an aspect of the present invention that optical system 300 induces the Π radian difference between the relative phases of the components of first signal 130 and the relative components of second signal 132. First signal 130 and second signal 132, therefore, are complimentary signals wherein a change in the intensity of one must be matched by an equal and opposite change in the intensity of the other. By detecting and comparing first signal 130 and second signal 132, as discussed below, gravimeter 100 can have improved sensitivity as compared to conventional differential gravimeters.

It should be noted that the present invention still provides a sensitivity improvement over the prior art when the difference in the relative phase differences between the components of first signal 130 and second signal 132 is not exactly Π radians, as long as the difference has a magnitude that is between Π/2 and 3Π/2. In some embodiments, therefore, optical system 300 induces a difference in the relative phase differences between the components of first signal 130 and second signal 132 that is within the range of (n+1/2)*Π to (n+3/2)*Π.

In some embodiments, the path lengths of reference arm 110, sample arm 114, detector arm 302, and detector arm 304 are such that reference component 122 and sample component 125 have a relative phase difference of n*Π, wherein n is a negative or positive integer. In some embodiments, the path lengths of reference arm 110, sample arm 114, detector arm 302, and detector arm 304 are such that reference component 124 and sample component 128 have a relative phase difference of n*2Π, wherein n is a negative or positive integer.

In operation, the position of mirror 408-1 is a function of the local gravity at sensor 116-1 (i.e., at location L1). As a result, the phase of reference component 122 at photodetector 134 and the phase of reference component 124 at photodetector 134-2 are based on the local gravity at sensor 116-1.

In similar fashion, the position of mirror 408-2 is a function of the local gravity at sensor 116-2 (i.e., at location L2). As a result, the phase of sample component 124 at photodetector 134 and the phase of sample component 128 at photodetector 134-2 are also based on the local gravity at sensor 116-2.

By virtue of the fact that the relative phases of the signals of first signal 130 and the relative phases of the signals of second signal 132 are different by Π radians, first signal 130 and second signal 132 are complimentary signals that contain all of the optical energy of input signal 102 (disregarding optical losses through optical system 300). As a result, a decrease in intensity of one of the signals is matched by a commensurate increase in intensity of the other signal.

When the gravitational field in the z-direction at location L2 becomes different than the gravitational field in the z-direction at location L1, mass 402-2 moves to a different position along axis 412-2. This changes the length of sample path length P2, which thereby changes the phase of sample signal 120 as received by beamsplitter 106. As a result, the phases of sample components 126 and 128 at photodetectors 134 and 134-2 also change. Since sample components 126 and 128 are out of phase by Π radians at their respective photodetectors, the intensities of first signal 130 and second signal 132 change by equal and opposite amounts.

At operation 206, photodetector 134 generates electrical signal 138 based on the intensity of first signal 130.

At operation 207, photodetector 134-2 generates electrical signal 140 based on the intensity of second signal 132. Photodetectors 134 and 134-2 operate in complimentary fashion, wherein a decrease in the magnitude of one of electrical signals 138 and 140 is matched by an increase in the magnitude of the other one of electrical signals 138 and 140.

At operation 208, processor 142 generates output 144 based on electrical signals 138 and 140. Since electrical signals 138 and 140 are complimentary, a change in the magnitude of output signal 144 is twice as large as a change in the magnitude of either of the electrical signals. Gravimeter 100, therefore, has twice the sensitivity of a conventional differential gravimeter.

Figure 5:
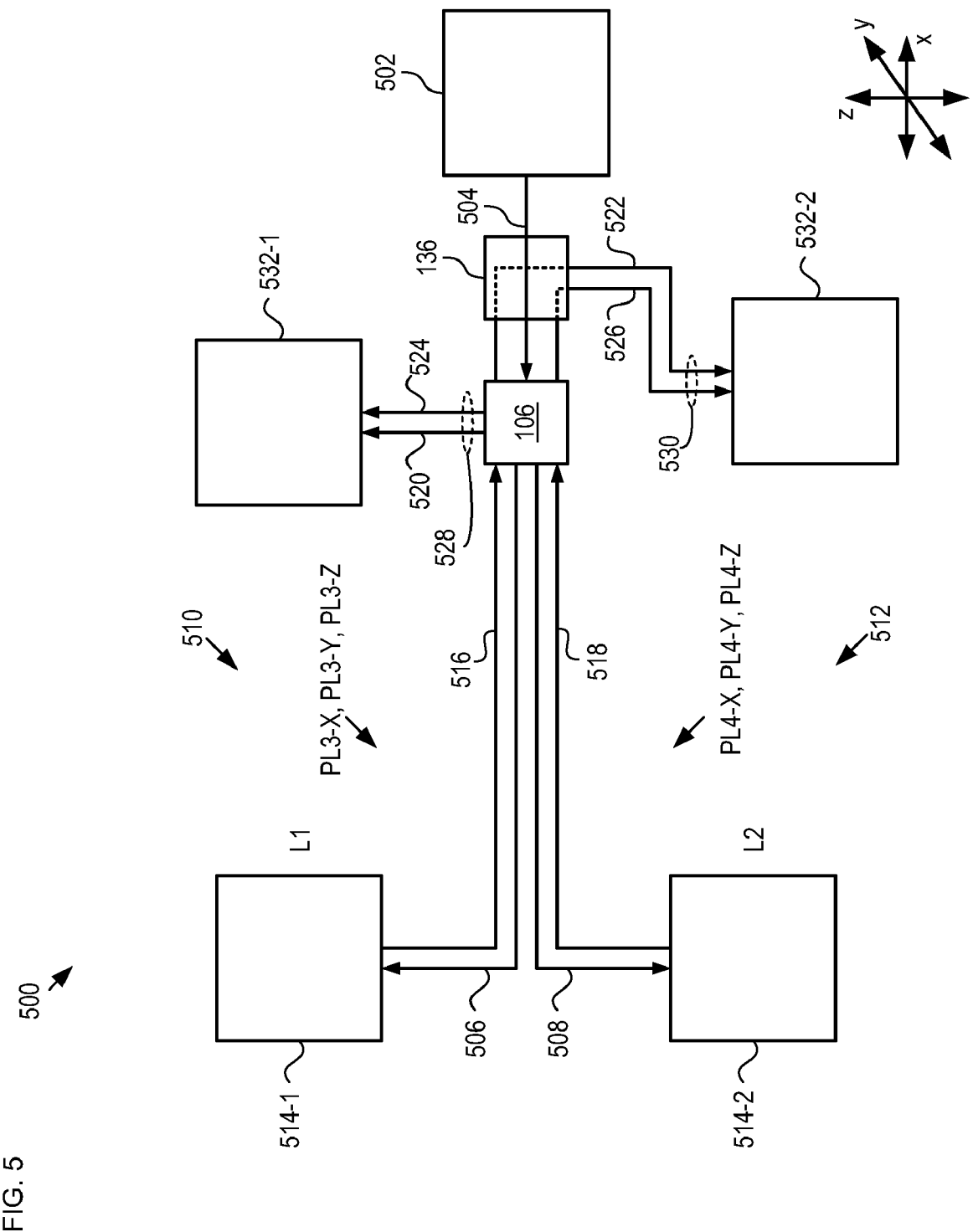
FIG. 5 depicts a three-dimensional differential gravimeter in accordance with an alternative embodiment of the present invention.

FIG. 5 depicts a three-dimensional differential gravimeter in accordance with an alternative embodiment of the present invention. Gravimeter 500 comprises multi-wavelength source 502, beam splitter 106, multi-axis sensor modules 514-1 and 514-2, and multi-wavelength detection modules 532-1 and 532-2. Gravimeter 500 enables gravity gradients to be sensed along the x-, y-, and z-directions, wherein the x-, y-, and z-directions are mutually orthogonal.

Figure 6:
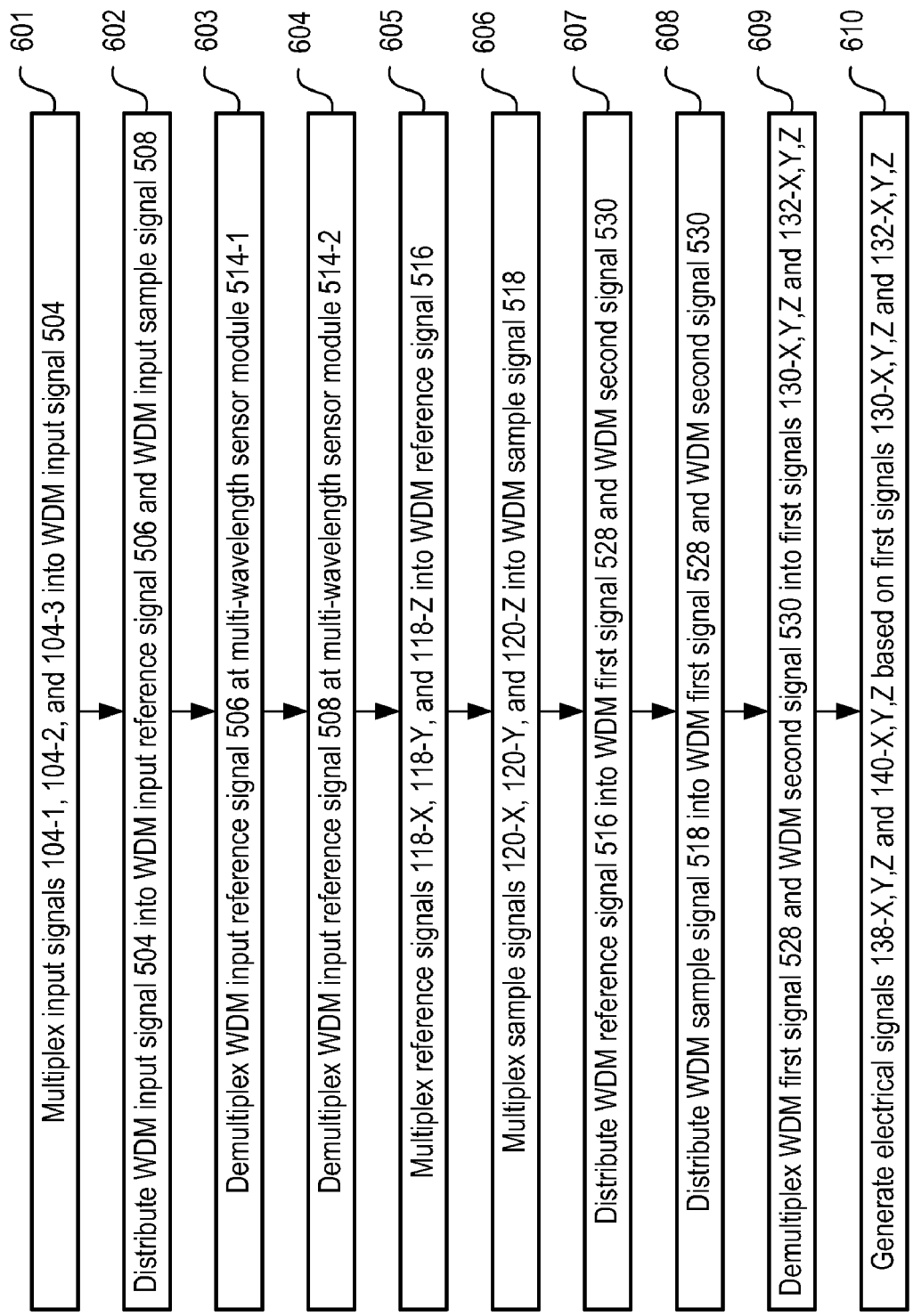
FIG. 6 depicts a method for sensing gravity gradients between two locations, in three-dimensions, in accordance with the alternative embodiment of the present invention.

FIG. 6 depicts a method for sensing gravity gradients between two locations, in three-dimensions, in accordance with the alternative embodiment of the present invention. Method 600 begins with operation 601, wherein wavelength-division multiplexed (WDM) input signal 504 is provided by multiplexing input signals 104-X, 104-Y, and 104-Z.

Figure 7:
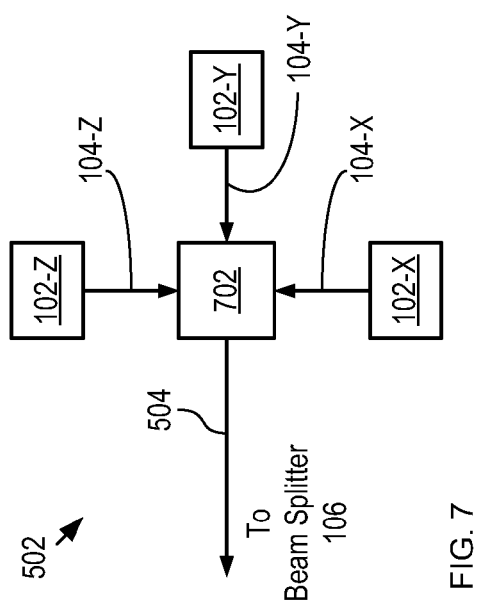
FIG. 7 depicts a multi-wavelength source in accordance with the alternative embodiment of the present invention.

FIG. 7 depicts a multi-wavelength source in accordance with the alternative embodiment of the present invention. Multi-wavelength source 502 comprises source 102-X, 102-Y, and 102-Z, which provide input signals 104-X, 104-Y, and 104-Z, respectively, and multiplexor 702. Each of input signals 104-X, 104-Y, and 104-Z is characterized by a unique wavelength.

Multiplexor 702 is a conventional optical element for multiplexing a plurality of signals having different wavelengths into a single WDM signal. Multiplexor 702 combines input signals 104-X, 104-Y, and 104-Z into WDM input signal 504.

At operation 602, beam splitter 106 receives WDM input signal 504 and distributes its optical energy equally into WDM input reference signal 506 and WDM input sample signal 508.

At operation 603, multi-wavelength sensor module 514-1 receives WDM input reference signal 506 and demultiplexes it by wavelength into input reference signals 108-X, 108-Y, and 108-Z.

Figure 8:
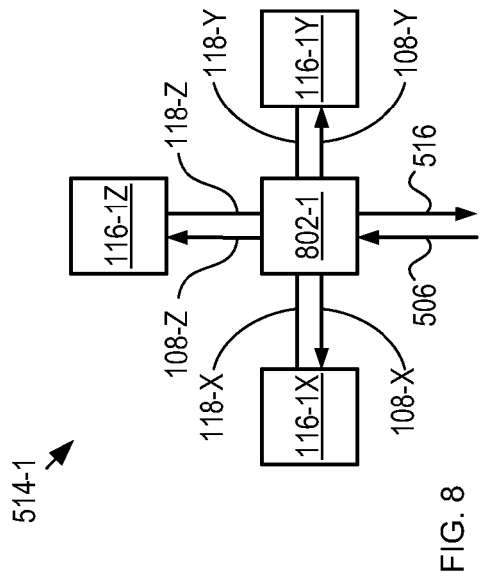
FIG. 8 depicts multi-wavelength sensor module 514-1.

FIG. 8 depicts multi-wavelength sensor module 514-1. Sensor module 514-1 comprises sensors 116-1X, 116-1Y, and 116-1Z, and wavelength distributor 702-1. Sensor module 514-1 is representative of sensor module 514-2. Sensor module 514-1 is representative of sensor module 514-2; however, sensor module 514-2 comprises sensors 116-2X, 116-2Y, and 116-2Z, and distributor 802-2.

Distributor 802-1 is a conventional optical element for Demultiplexing a WDM signal into a plurality of signals having different wavelengths. Distributor 802-1 separates WDM input reference signal 506 into input reference signals 108-X, 108-Y, and 108-Z and provides them to sensors 116-1X, 116-1Y, and 116-1Z, respectively. In some embodiments, wavelength distributor 802-1 comprises one or more chromatic beam splitters.

Operation of each of sensors 116-1X, 116-1Y, and 116-1Z is analogous to the operation of sensor 116-1 of gravimeter 100, wherein sensor 116-1X (i.e., axis 412-1X) is aligned with the x-direction, sensor 116-1Y is aligned with the y-direction, and sensor 116-1Z is aligned with the z-direction. For example, sensor 116-1X comprises mirror 408-1X, whose position along axis 412-1X is based on the gravitational field along the x-direction at location L1.

Each of sensors 116-1X, 116-1Y, and 116-1Z reflects its corresponding input reference signal as a reference signal. For example, sensor 116-1X reflects input reference signal 108-X back to distributor 802-1 as reference signal 118-X.

At operation 605, reference signals 118-X, 118-Y, and 118-Z are recombined at distributor 802-1 to form WDM reference signal 516. Since the distance between beam splitter 106 and distributor 802-1 is fixed, each of path lengths PL3-X, PL3-Y, and PL3-Z is based on the position of each of mirrors 408-1X, 408-1Y, and 408-1Z, respectively.

In similar fashion, wavelength distributor 802-2 separates WDM input sample signal 508 into input sample signals 112-X, 112-Y, and 112-Z and provides them to sensors 116-2X, 116-2Y, and 116-2Z, respectively.

Each of sensors 116-2X, 116-2Y, and 116-2Z reflects its corresponding input sample signal as a sample signal. For example, sensor 116-2X reflects input sample signal 112-X back to distributor 802-2 as sample signal 120-X.

At operation 606, sample signals 120-X, 120-Y, and 120-Z are recombined at distributor 802-1 to form WDM sample signal 516. Since the distance between beam splitter 106 and distributor 802-2 is fixed, each of path lengths PL4-X, PL4-Y, and PL4-Z is based on the position of each of mirrors 408-2X, 408-2Y, and 408-2Z, respectively.

At operation 607, beam splitter 106 distributes the optical energy in WDM reference signal 516 equally into WDM first signal 528.

At operation 608, beam splitter 106 distributes the optical energy in WDM sample signal 518 equally into WDM second signal 530.

Figure 9:
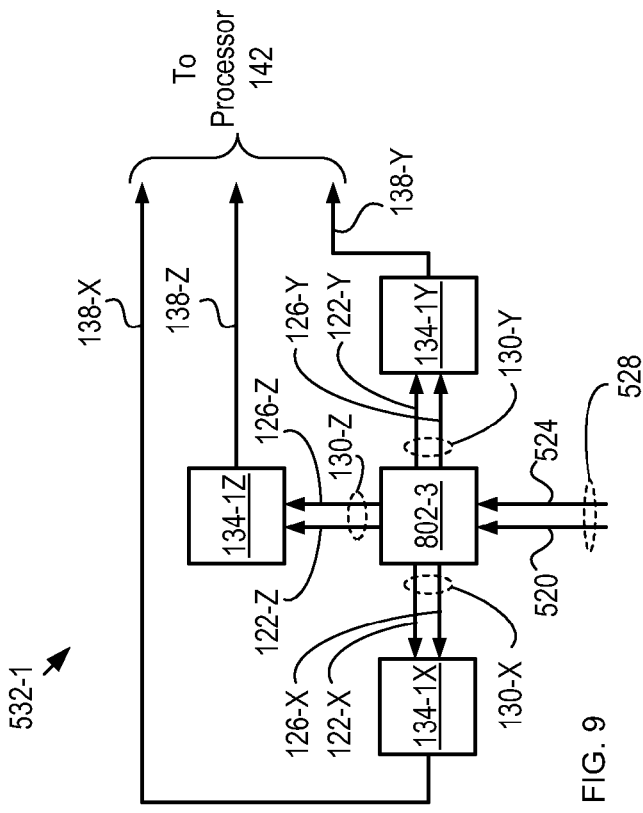
FIG. 9 depicts multi-wavelength detection module 532-1.

FIG. 9 depicts multi-wavelength detection module 532-1. Detection module 532-1 comprises distributor 802-3 and photodetectors 134-1X, 134-1Y, and 134-1Z. Detection module 532-1 is representative of detection module 532-2; however, detection module 532-2 comprises sensors 116-2X, 116-2Y, and 116-2Z, and distributor 802-4.

At operation 609, distributor 802-3 separates WDM first signal 528 into first signals 130-X, 130-Y, and 130-Z and provides them to photodetectors 134-1X, 134-1Y, and 134-1Z, respectively. Also at operation 609, distributor 802-4 separates WDM second signal 530 into second signals 132-X, 132-Y, and 132-Z and provides them to photodetectors 134-2X, 134-2Y, and 134-2Z, respectively.

At operation 610, photodetectors 134-1X, 134-1Y, and 134-1Z generate electrical signals 138-1X, 138-1Y, and 138-1Z, respectively. Also at operation 610, photodetectors 134-2X, 134-2Y, and 134-2Z generate electrical signals 138-2X, 138-2Y, and 138-2Z, respectively.

In analogous fashion to gravimeter 100, processor 142 receives electrical signals 138-1X, 138-1Y, 138-1Z, 138-2X, 138-2Y, and 138-2Z and provides an output signal for the differential gravity along the x-, y-, and z-directions between locations L1 and L2.

Although gravimeter 500 is a three-dimensional gravimeter, it will be clear to one skilled in the art, after reading this specification, how to make and use alternative embodiments of the present invention that are two-dimensional gravimeters.

Further, it will be clear to one skilled in art how to make two- and three-dimensional gravimeters wherein the axes of sensitivity are not orthogonal.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A differential gravimeter comprising:
   a first interferometer, wherein the first interferometer comprises:
   a first reference arm having a first reference path length that is based on a first gravitational field, wherein the first reference arm conveys a first reference signal;
   a first sample arm having a first sample path length that is based on a second gravitational field, wherein the first sample arm conveys a first sample signal;
   a first beam splitter, wherein the first beam splitter distributes the first reference signal into a first signal and a second signal, and wherein the first beam splitter distributes the first sample signal into the first signal and the second signal;
   a first photodetector, wherein the first photodetector receives the first signal; and
   a second photodetector, wherein the second photodetector receives the second signal;
   wherein a change in a difference between the first reference path length and the first sample path length induces a first intensity change in the first signal and a second intensity change in the second signal, and wherein the first intensity change and the second intensity change are equal and opposite; and
   wherein a change in a difference between the first gravitational field and the second gravitational field induces the first intensity change of the first signal and the second intensity change of the second signal;
   wherein the gravimeter outputs an output signal representing a differential gravity based on a difference between the first gravitational field and the second gravitational field.

2. The gravimeter of claim 1 further comprising:
   a first sensor at a first location, wherein the first sensor comprises a first mirror having a first position on a first axis, and wherein the first position is based on the first gravitational field, and further wherein the first reference path length is based on the first position; and
   a second sensor at a second location, wherein the second sensor comprises a second mirror having a second position on a second axis, and wherein the second position is based on the second gravitational field, and wherein the first sample path length is based on the second position.

3. The gravimeter of claim 2 further comprising a frame, wherein the frame comprises a first physical adaptation for conveying at least one of mechanical energy and thermal energy between the first sensor and the second sensor.

4. The gravimeter of claim 1 further comprising a second interferometer, wherein the second interferometer comprises:
   a second reference arm having a second reference path length that is based on a third gravitational field, wherein the second reference arm conveys a second reference signal;
   a second sample arm having a second sample path length that is based on a fourth gravitational field, wherein the second sample arm conveys a second sample signal;
   a second beam splitter, wherein the second beam splitter distributes the second reference signal into a third signal and a fourth signal, and wherein the second beam splitter distributes the second sample signal into the third signal and the fourth signal;
   a third photodetector, wherein third photodetector receives the third signal; and
   a fourth photodetector, wherein the fourth photodetector receives the fourth signal;
   wherein a change in the difference between the second reference path length and the second sample path length induces a third intensity change in the third signal and a fourth intensity change in the fourth signal, and wherein the third intensity change and the fourth intensity change are equal and opposite.

5. The gravimeter of claim 4 wherein the first beam splitter and the second beam splitter are the same beam splitter, and wherein the first photodetector and the third photodetector are the same photodetector, and further wherein the second photodetector and the fourth photodetector are the same photodetector.

6. The gravimeter of claim 4 wherein the first gravitational field and the second gravitational field are aligned with a first direction, and wherein the third gravitational field and fourth gravitational field are aligned with a second direction, and further wherein the first direction and second direction are mutually orthogonal.

7. The gravimeter of claim 4 further comprising a third interferometer, wherein the third interferometer comprises:

a third reference arm having a third reference path length that is based on a fifth gravitational field, wherein the third reference arm conveys a third reference signal;

a third sample arm having a third sample path length that is based on a sixth gravitational field, wherein the third sample arm conveys a third sample signal;

a third beam splitter, wherein the third beam splitter distributes the third reference signal into a fifth signal and a sixth signal, and wherein the third beam splitter distributes the third sample signal into the fifth signal and the sixth signal;

a fifth photodetector, wherein the fifth photodetector receives the fifth signal; and a sixth photodetector, wherein the sixth photodetector receives the sixth signal;

wherein a change in the difference between the third reference path length and the third sample path length induces a fifth intensity change in the fifth signal and a sixth intensity change in the sixth signal, and wherein the fifth intensity change and the sixth intensity change are equal and opposite; and wherein the first gravitational field and the second gravitational field are aligned with a first direction, and wherein the third gravitational field and fourth gravitational field are aligned with a second direction, and wherein the fifth gravitational field and sixth gravitational field are aligned with a third direction, and further wherein the first direction, second direction, and third direction are mutually orthogonal.

8. The gravimeter of claim 7 wherein the first beam splitter, second beam splitter, and third beam splitter are the same beam splitter, and wherein the first photodetector, third photodetector, and fifth photodetector are the same photodetector, and further wherein the second photodetector, fourth photodetector, and sixth photodetector are the same photodetector.

9. A differential gravimeter comprising:
a beam splitter, wherein the beam splitter distributes an input signal into an input reference signal and an input sample signal;

a first sensor at a first location, wherein the first sensor comprises a first mirror having a first position along a first axis, and wherein the first position is based on a first gravitational field at the first location, and further wherein the first mirror reflects the input reference signal as a reference signal;

a second sensor at a second location, wherein the second sensor comprises a second mirror having a second position along a second axis, and wherein the second position is based on a second gravitational field at the second location, and further wherein the second mirror reflects the input sample signal as a sample signal;

a first photodetector, wherein the first photodetector provides a first electrical signal based on a first reference component and a first sample component; and a second photodetector, wherein the second photodetector provides a second electrical signal based on a second reference component and a second sample component;

wherein the beam splitter distributes the reference signal into the first reference component and the second reference component, and wherein the beam splitter distributes the sample signal into the first sample component and the second sample component;

wherein the first axis, the second axis, the first gravitational field, and the second gravitational field are aligned;

wherein a change in one of the first position and the second position induces equal and opposite changes in the first electrical signal and the second electrical signal;

wherein a change in a difference between the first gravitational field and the second gravitational field induces a first intensity change of the first electrical signal and a second intensity change of the second electrical signal, and wherein the first intensity change is equal and opposite the second intensity change; and wherein the gravimeter outputs an output signal representing a differential gravity based on a difference between the first gravitational field and the second gravitational field.

10. A method of sensing differential gravity comprising:
distributing a first reference signal into a first reference component and a second reference component, wherein the first reference signal is based on a first reference path length that is based on a first gravitational field;

distributing a first sample signal into a first sample component and a second sample component, wherein the first sample signal is based on a first sample path length that is based on a second gravitational field;

forming a first signal comprising the first reference component and the first sample component;

forming a second signal comprising the second reference component and the second sample component;

providing a first electrical signal based on the first signal; and providing a second electrical signal based on the second signal;

wherein a change in a difference between the first reference path length and the first sample path length induces a first change of the first electrical signal and a second change of the second electrical signal, and wherein the first change is equal and opposite the second change;

wherein the first gravitational field and the second gravitational field are aligned with a first direction; and wherein a change in a difference between the first gravitational field and the second gravitational field induces the first change of the first electrical signal and the second change of the second electrical signal; and outputting an output signal representing the differential gravity based on a difference between the first gravitational field and the second gravitational field.

11. The method of claim 10 further comprising inducing a 180° phase shift on one of the first sample component and the second sample component.

12. The method of claim 10 further comprising:
providing a first sensor at a first location, wherein the first sensor comprises a first mirror having a first position that is based on the first gravitational field, and wherein the first mirror reflects a first input reference signal as the first reference signal;

providing a second sensor at a second location, wherein the second sensor comprises a second mirror having a second position that is based on the second gravitational field, and wherein the second mirror reflects a first input sample signal as the first sample signal.

13. The method of claim 12 further comprising enabling the conveyance of at least one of mechanical energy and thermal energy between the first sensor and the second sensor.

14. The method of claim 10 further comprising:
distributing a second reference signal into a third reference component and a fourth reference component, wherein the second reference signal is based on a second reference path length that is based on a third gravitational field;

distributing a second sample signal into a third sample component and a fourth sample component, wherein the second sample signal is based on a second sample path length that is based on a fourth gravitational field;

forming a third signal comprising the third reference component and the third sample component;

forming a fourth signal comprising the fourth reference component and the fourth sample component;

providing a third electrical signal based on the third signal; and providing a fourth electrical signal based on the fourth signal;

wherein a change in a difference between the second reference path length and the second sample path length induces a third change of the third signal and a fourth change of the fourth signal, and wherein the third change is equal and opposite the fourth change; and wherein the third gravitational field and the fourth gravitational field are aligned with a second direction that is unaligned with the first direction.

15. The method of claim 14 further comprising aligning the first direction and the second direction as mutually orthogonal directions.

16. The method of claim 14 further comprising:

distributing a third reference signal into a fifth reference component and a sixth reference component, wherein the third reference signal is based on a third reference path length that is based on a fifth gravitational field;

distributing a third sample signal into a fifth sample component and a sixth sample component, wherein the third sample signal is based on a third sample path length that is based on a sixth gravitational field;

forming a fifth signal comprising the fifth reference component and the fifth sample component;

forming a sixth signal comprising the sixth reference component and the sixth sample component;

providing a fifth electrical signal based on the fifth signal; and providing a sixth electrical signal based on the sixth signal;

wherein a change in a difference between the third reference path length and the third sample path length induces a fifth change of the fifth signal and a sixth change of the sixth signal, and wherein the fifth change is equal and opposite the sixth change.

17. The method of claim 16 further comprising aligning the first direction, second direction, and third direction as mutually orthogonal directions.

18. The method of claim 10 further comprising:

establishing the first reference path length; and establishing the first sample path length, wherein the first reference path length and the first sample path length are different by an amount substantially equal to $n*2\pi$, and wherein n is one of a negative integer, a positive integer, and zero.

* * * * *